United States Patent
Kong et al.

[11] Patent Number: 5,675,596
[45] Date of Patent: Oct. 7, 1997

[54] PASSIVELY Q-SWITCHED LASER WITH A DUAL-CAVITY CONFIGURATION

[75] Inventors: Hong-Jin Kong; Nam-Seong Kim, both of Taejon, Rep. of Korea

[73] Assignee: Korea Advanced Institute of Science and Technology, Taejon, Rep. of Korea

[21] Appl. No.: 605,359

[22] Filed: Feb. 22, 1996

[30] Foreign Application Priority Data

Feb. 25, 1995 [KR] Rep. of Korea .................. 95-3777

[51] Int. Cl.$^6$ .................................................. H01S 3/10
[52] U.S. Cl. ........................... 372/25; 372/99; 372/10; 372/97; 372/92
[58] Field of Search .................. 372/92, 98, 99, 372/10, 108, 23, 25

[56] References Cited

U.S. PATENT DOCUMENTS

| | | | |
|---|---|---|---|
| 5,133,077 | 7/1992 | Zayhowski et al. | 372/10 |
| 5,195,104 | 3/1993 | Geiger et al. | 372/10 |
| 5,394,413 | 2/1995 | Zayhowski | 372/10 |

OTHER PUBLICATIONS

Kong et al., Forced Turn-off a Passively Q-Switched Nd: YAG Pulse by Restoration of Saturable Loss by the Use of an Auxiliary Cavity, Optics Letters, 20(8): 884–886 (1995).

Kim et al., A Passively Q-Switched Nd:YAG Laser with a Variable Pulse Width Using LiF:F$_2$-Color-Center Crystal in a Dual-Cavity Configuration, Jpn. J. Appl. Phys., 34: L303–L305 (1995).

*Primary Examiner*—Leon Scott, Jr.
*Attorney, Agent, or Firm*—Jacobson, Price, Holman & Stern, PLLC

[57] ABSTRACT

The present invention relates to a passively Q-switched laser with a dual-cavity configuration to obtain a symmetrical laser pulse with a short and variable pulse width. The passively Q-switched laser comprises: a laser medium and a passively Q-switching medium; a cavity mirror capable of fully reflecting the respective wavelengths emitted from the laser medium and the passively Q-switching medium; a main cavity mirror composed of a dichroic mirror having non-reflective characteristics for the light emitted from the passively Q-switching medium and reflective characteristics for the light emitted from the laser medium with a reflectivity of 10% or more; and, an auxiliary cavity mirror composed of a dichroic mirror having non-reflective characteristics for the light emitted from the laser medium and reflective characteristics for the light emitted from the passively Q-switching medium with a reflectivity of 10% or more and capable of moving transversely against the laser beam.

6 Claims, 2 Drawing Sheets

PASSIVELY Q-SWITCHED LASER WITH A DUAL-CAVITY CONFIGURATION

FIELD OF THE INVENTION

The present invention relates to a passively Q-switched laser, more specifically, to a novel passively Q-switched laser with a dual-cavity configuration to obtain a symmetrical laser pulse with short and variable pulse width.

BACKGROUND OF THE INVENTION

A laser emits a light by the principle of stimulated emission by which an energy input into a laser is discharged as a laser output. The stimulated emission can be accelerated by reciprocating a laser beam between two reflex mirrors which are positioned at both sides of a laser medium. Thus, when considering only the longitudinal direction in which a laser beam emits, a laser can be formed by positioning a laser medium between two reflex mirrors, where a high-intensity and short laser pulse can be obtained by holding an energy input into a laser for a longer time than in a usual case. In other words, when a laser emits, a high-intensity and short laser pulse can be obtained by controlling the stimulated emission so that an energy input into the laser does not to run out from the laser.

Among conventional methods by which a high-intensity and short laser pulse is obtained, based on the principle of stimulated emission as described above, a method employing a passive Q-switch has been provided in the art(see: A. Penzkofer, et al., Appl. Phys. Lett., 20:351 (1972)).

According to the method, a passively Q-switching material having characteristics of a saturable absorber is positioned between a laser medium and a reflex mirror. The saturable absorber is a material having the nature that it initially absorbs an energy of laser beam to become a closed state against the laser beam, and then, when absorbing an energy of a given amount or more, it becomes a transparent state against the laser beam to transmit almost the laser beam. Accordingly, a high-intensity and short laser beam can be obtained by controlling the stimulated emission so as not to occur, until a passively Q-switching material such as the saturable absorber is changed from a closed state to a transparent state. Such a passively Q-switched laser has the advantage that a high-intensity and short laser beam can be obtained without special auxiliary equipments, by employing the passively Q-switching material only, while it has suffered from the drawback that an asymmetrical pulse laser with a long decay tail is obtained due to the lifetime, i.e., a period of time the saturable absorber is maintained at a transparent state until it returns to a reclosed state after it has turned to the transparent state. That is, such a passively Q-switched laser has a defect that only an asymmetrical pulse having a very long tail part is obtainable, owing to the nature of a passively Q-switching material. Moreover, the passively Q-switched laser has another defect that it cannot vary the pulse width.

On the other hand, a method using electrooptic switches has been also suggested to shorten the pulse width (see: F. Rainer, Rev. Sci. Instrum., 40:368 (1989)).

According to the method, two polarizers for an incident laser beam pulse, i.e., a horizontal and a vertical polarizers, are set up such that they are positioned perpendicularly, and a nonlinear crystal, such as a Pockels cell, which can rotate the polarization of a laser beam pulse by 90° only during a period of time an electrical pulse having a constant and high-voltage is applied to, is positioned between the said two polarizers. Thus, when a laser beam pulse is incident on the horizontal polarizer, only the polarized component in the horizontal direction transmits, grounded on the nature of a polarizer, and a high-voltage and short pulse is applied to the nonlinear crystal for a constant time within the duration time of the laser beam pulse. Then, among the laser beam pulses which transmit the nonlinear crystal, only the laser beam pulses which are fallen within the duration time of the high-voltage and short pulse applied to the nonlinear crystal, come to have the polarization rotated by 90°, and the polarization direction is changed to the vertical polarization. However, the laser beam pulses which are beyond the duration time of the high-voltage and short pulse maintain the horizontal polarization without rotating the polarization direction. Accordingly, when laser beam pulses which have transmitted the nonlinear crystal are incident on the vertical polarizer, only the laser beam pulses having the vertical polarization component can transmit the vertical polarizer owing to the nature of a polarizer, because the polarization directions of the vertical and the horizontal polarizers are perpendicular with each other. In other words, since only the laser beam pulse which is fallen within the duration time of the high-voltage and short pulse can transmit the said two polarizers and the nonlinear crystal, the pulse width of the laser beam pulse equals to the duration time of the high-voltage and short pulse and the pulse width can be varied. Such a method can vary the pulse width by employing two ways of electrooptical Q-switches and simple pulse slicing, and has the advantage that a symmetrical laser pulse with short and variable pulse width can be obtained. However, it has revealed demerits that the equipment is very complicated and the cost is extra high, since it essentially entails an expensive and precise timing control and external driving circuitry.

Accordingly, the prior art lasers have limitations in their practical and industrial application; and, needs have continued to exist for the development of a simple and convenient laser by which a symmetrical laser pulse with short and variable pulse width can be obtained.

SUMMARY OF THE INVENTION

In accordance with the present invention, it has been discovered that: a passively Q-switched laser with a dual-cavity configuration employing a passive Q-switching and an auxiliary cavity for lasing the light emitted from the passive Q-switching, enables the pulse width to be varied and a short and symmetrical laser pulse to be emitted without incidental equipments.

A primary object of the present invention is, therefore, to provide a novel passively Q-switched laser with a dual-cavity configuration by which a symmetrical laser pulse with short and variable pulse width can be obtained in a simple and convenient manner.

BRIEF DESCRIPTION OF THE DRAWINGS

The above and the other objects and features of the present invention will become apparent from the following descriptions given in conjunction with the accompanying drawings, in which.

DETAILED DESCRIPTION OF THE INVENTION

The passively Q-switched laser with a dual-cavity configuration of the present invention comprises:
- a laser medium and a passively Q-switching medium;
- a cavity mirror capable of fully reflecting the respective wavelengths emitted from the laser medium and the passively Q-switching medium;
- a main cavity mirror composed of a dichroic mirror having non-reflective characteristics for the light emitted from the passively Q-switching medium and reflective characteristics for the light emitted from the laser medium with a reflectivity of 10% or more; and,
- an auxiliary cavity mirror composed of a dichroic mirror having non-reflective characteristics for the light emitted from the laser medium and reflective characteristics for the light emitted from the passively Q-switching medium with a reflectivity of 10% or more and capable of moving transversely against the laser beam.

Preferred embodiment of the passively Q-switched laser with a dual-cavity configuration of the present invention is explained in details with reference of accompanying drawings, which should not be taken to limit the scope of the present invention.

Figure 1:
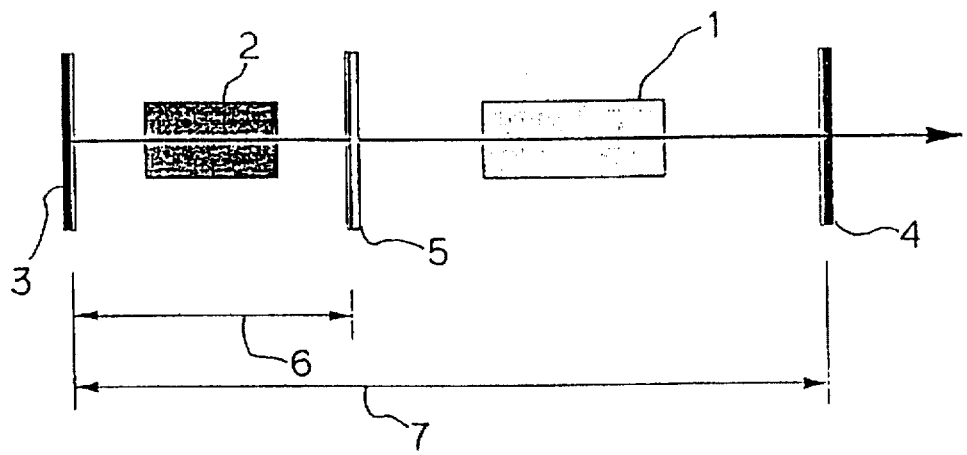
FIG. 1 illustrates a configuration of the dual-cavity Q-switched laser of the present invention.

FIG. 1 illustrates an embodiment of the passively Q-switched laser according to the present invention, wherein an Nd:YAG crystal is employed as a laser medium (1); and, a lithium fluoride (LiF:$F_2^-$, hereinafter, referred to as "LiF") colour-center crystal having characteristics of a saturable absorber is employed as a passively Q-switching medium (2), since it is very stable at room temperature and even for a high-intensity incident laser beam, and has a water-resistant property.

The passively Q-switched laser shown in FIG. 1 comprises: a laser medium and a passively Q-switching medium; a main cavity; and, an auxiliary cavity for lasing the light emitted from the passively Q-switched laser. The main cavity consists of a cavity mirror(3) and a main cavity mirror(4), and the auxiliary cavity consists of a cavity mirror(3) and an auxiliary cavity mirror(5). The cavity mirror(3) is used as a mirror in both of the main and the auxiliary cavities, and it serves as a broadband full mirror for the respective wavelengths emitted from the laser medium (1) and the passively Q-switching medium(2). The main cavity mirror(4) consists of a dichroic mirror which has non-reflective characteristics for the light emitted from the passively Q-switching medium(2) as well as reflective characteristics for the light emitted from the laser medium(1) with a reflectivity of at least 10%, which are adjusted depending on the characteristics of the laser medium(1) and the dual-cavity configuration. The auxiliary cavity mirror(5) consists of a dichroic mirror which has non-reflective characteristics for the light emitted from the laser medium(1) as well as reflective characteristics for the light emitted from the passively Q-switching medium(2) with a reflectivity of at least 10%, which are adjusted depending on the characteristics of said passively Q-switching medium(2) and the dual-cavity configuration, and can be moved transversely against the laser beam.

Hereinafter, the advantageous effects of the passively Q-switched laser with a dual-cavity configuration of the present invention will be explained in details.

Photons emitted from a laser medium(1) of an Nd:YAG crystal which is positioned in the main cavity, are absorbed in a passively Q-switching medium(2) of a LiF colour-center crystal to change the passively Q-switching medium(2) to a transparent state. At this time, the light emitted from the LiF colour-center crystal in the auxiliary cavity is lased by the mirrors of the auxiliary cavity, and it makes the LiF colour-center crystal having characteristics of a saturable absorber reclosed. Accordingly, the passively Q-switching medium is maintained at a transparent state owing to the lifetime of the passively Q-switching material, which obstructs the occurrence of a laser pulse with a long decay tail. That is, a period of time which the passively Q-switching medium is maintained at a transparent state may be shortened by using the dual-cavity configuration, finally to give a short and symmetric laser pulse. In addition, if the length(6) of the auxiliary cavity is changed by moving the auxiliary cavity mirror(5), the lasing time of the light emitted from LiF in the auxiliary cavity can be controlled, which may in turn vary the width of the emitted laser pulse.

The present inventors prepared a laser and its configuration is schematically shown in FIG. 1. An Nd:YAG rod with a length of 10 cm and a diameter of 8.0 mm, and a LiF crystal having $F_2^-$ colour-center, a thickness($l_a$) of 4.5 cm and an initial transmittance of 50%, were employed as a laser medium and a passively Q-switching medium, respectively. The lengths(7) and (6) of the main and the auxiliary cavities were represented as $l_{mc}$ and $l_{ac}$, respectively. A broadband full mirror for different species of lights emitted from the Nd:YAG rod and the LiF crystal, which has a radius of curvature of 5.0 m, was employed as the cavity mirror(3); a flat dichroic mirror with an infinite radius of curvature and almost negligible reflectivity of 3% for the light emitted from the Nd:YAG rod and a reflectivity of 90% for the emitted light from the LiF crystal, was used as the auxiliary mirror(5); and, a flat mirror with an infinite radius of curvature and a reflectivity of 20% ($R_{1064}$=20%) for the light emitted from the Nd:YAG rod and almost negligible reflectivity of 3% for the light emitted from the LiF crystal, was used as the main cavity mirror(4). The length(6) of the auxiliary cavity was varied by moving the auxiliary cavity mirror(5), if necessary.

To measure the pulse profile of the laser output, the present inventors used a PIN photodiode with a rise time of 0.5 nanosecond(ns) and a digitizer with a real-time sampling frequency of 2 GHz as a pulse profile analyzer. When a main cavity length ($l_{mc}$) was maintained to have 90 cm and auxiliary cavity lengths ($l_{ac}$) were maintained as 15, 20, 25 and 30 cm, respectively, the aspect ratio (AR=$l_{ac}/l_{mc}$) which is defined as the ratio of the auxiliary cavity length to the main cavity length, was determined to have values of 0.17, 0.22, 0.28 and 0.33 for the respective auxiliary cavity lengths.

Figure 2A:
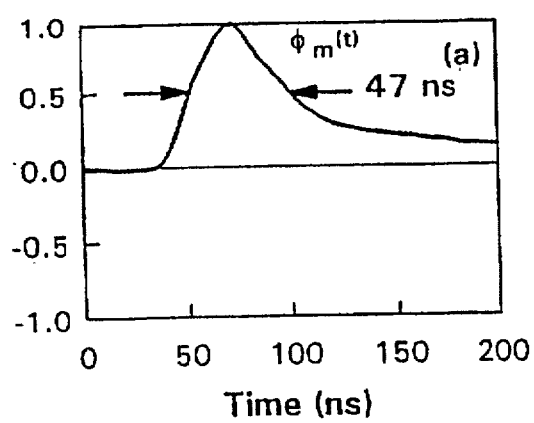
FIGS. 2(A) and 2(B) illustrate temporal Q-switched laser pulse profiles measured using the single-cavity and the dual-cavity configurations.
Figure 2B:
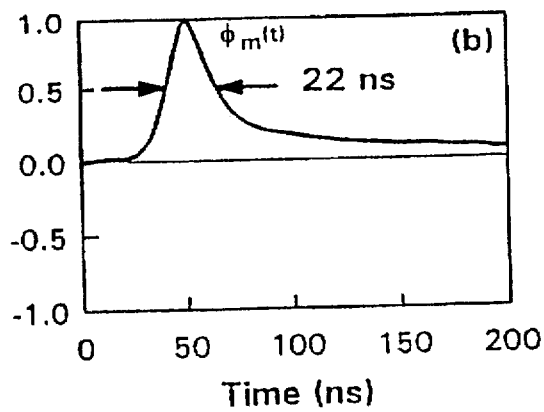

FIGS. 2(A) to 2(D) show the pulse profiles measured by the embodiment of the present invention and conventional single-cavity configuration, and the theoretically calculated results. In particular, FIGS. 2(A) and 2(B) show the pulse profiles of the laser pulse emitted by a conventional single-cavity configuration and the dual-cavity configuration of the present invention, with an aspect ratio of 0.17 using an auxiliary cavity with a length of 15 cm, respectively. The pulse width of FIG. 2(A) was 47 ns as shown in FIG. 2(A), while that of FIG. 2(B) was 22 ns as shown in FIG. 2(B). On the other hand, FIGS. 2(C) and 2(D) which show the theoretical simulation results for said two configurations illustrate that they are in good agreement with the experimental results of FIGS. 2(A) and 2(B).

In addition, to analyze the experimental results above, the inventors developed the normalized rate equations for the dual-cavity configuration. The inventors modified the rate equations for a conventional passive Q-switch of a single-cavity configuration(see: A. Szabo et al., J. Appl. Phys., 36:1562 (1965)), to obtain the following rate equations:

$$\frac{d\phi_m}{d\tau} = \left[ N_m + \left( N_{mi} - \frac{l_{mc}/\left(\frac{c}{n}\right)}{t_{mc}} \right) N_a - 1 \right] \phi_m \quad (1)$$

$$\frac{dN_m}{d\tau} = -\left( \frac{l_{mc}}{l_m} \right) N_m \phi_m \quad (2)$$

$$\frac{d\phi_a}{d\tau} = \left[ \frac{l_{mc}}{l_{ac}} \left( N_{mi} - \frac{l_{mc}/\left(\frac{c}{n}\right)}{t_{mc}} \right) \frac{N_a + 1}{2} - \right.$$

$$\left. \frac{l_{mc}/\left(\frac{c}{n}\right)}{t_{mc}} \frac{\gamma_{ac}}{\gamma_{mc}} \right] \phi_a \quad (3)$$

$$\frac{dN_a}{d\tau} = -\frac{l_{mc}}{l_m} \frac{\sigma_a}{\sigma_m} N_a \phi_m - \frac{l_{mc}}{l_a} \frac{\gamma_{ac}}{\gamma_{mc}} (N_a + 1)\phi_a \quad (4)$$

In the above equations (1), (2), (3) and (4), $\tau = t/\tau_c = c\gamma_{mc} t/2nl_{mc}$ denotes the reduced time variable;

$\tau c = 2nl_{mc}/c\gamma_{mc}$ denotes the modified cavity lifetime;

$t_{mc}$ denotes the main cavity round-trip time;

n denotes the refractive index of the medium;

c denotes the velocity of light;

$\sigma$ denotes the stimulated emission cross section; the subscripts "m" and "a" denote the Nd:YAG laser medium and the LiF saturable absorber crystal, respectively;

the subscripts "mc" and "ac" denote the main and the auxiliary cavities, respectively;

$l_{mc}$ and $l_{ac}$ denote the transmissions of the output couplers of the main and the auxiliary cavities, respectively;

$l_{mc}$ and $l_{ac}$ denote the lengths of the main and the auxiliary cavities, respectively;

$N_m$ and $N_a$ denote the population density differences, respectively;

$\phi_m$ and $\phi_a$ denote the photon densities in the main and the auxiliary cavities, respectively;

wherein said $N_m$, $N_a$, $\phi_m$ and $\phi_a$ being physical quantities normalized using the threshold condition, $N_m = \Delta N_m / N_{mt}$ where $\Delta N_m$ is the inversion density before normalizing; and, $N_{mt} = \gamma_{mc}/(2\sigma_m l_m N_m^{tot})$ where $N_{mt}$ is the threshold inversion of the main cavity medium; $\phi_m = \psi_m/(\gamma_{mc}/4\sigma_m l_m)$ where $\psi_m$ is the photon density of the main cavity before normalizing; and, $\gamma_{mc}/4\sigma_m l_m$ is the threshold photon density of the main cavity when $N_{mt}$ is fully converted into the 1064 nm output photons of the main cavity; $\phi_a = \psi_a/(\gamma_{ac}/2\sigma_a l_a)$ where $\phi_a$ is the photon density of the auxiliary cavity before normalizing; and, $\gamma_{ac}/2\sigma_a l_a$ is the threshold photon density of the auxiliary cavity when the threshold inversion density in the auxiliary cavity is fully converted into the 1120 nm output photons; and, $N_{mi}$ is the initial density inversion of the main cavity laser medium when the Q-switching process is started, provided that the LiF:F$_2^-$ colour-center crystal acts as a four-level laser.

Figure 2C:
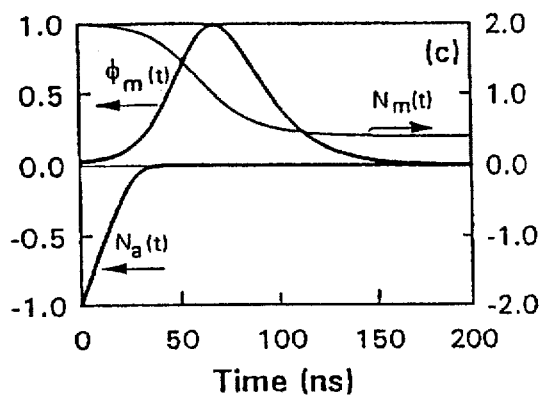
FIGS. 2(C) and 2(D) illustrate temporal evolution curves for the single-cavity and the dual-cavity configurations; and, FIG. 3 illustrates the pulse width versus the aspect ratio for the dual-cavity configuration.
Figure 2D:
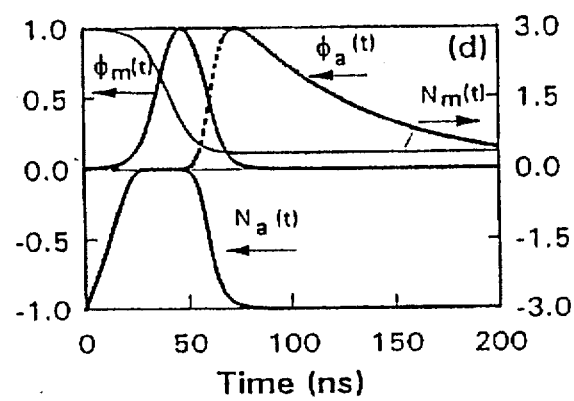

FIGS. 2(C) and 2(D) illustrate the temporal evolution curves of $\psi_m(t)$, $N_m(t)$, $\psi_a(t)$ and $N_a(t)$ for the single-cavity and the dual-cavity configurations, each of which were obtained by computer simulation. In FIGS. 2(C) and 2(D), the left-hand vertical axes represent the photon densities ($\psi_m(t)$ and $\psi_a(t)$), the right-hand vertical axes represent the population density differences($N_m(t)$ and $N_a(t)$), under an assumption that $N_m(0)/M_{mt}=2$ and $N_m(0)/M_{mt}=3$ are used therein.

In the curve of FIG. 2(C), the output pulse profiles with long decay tails are shown, which are typical for a passively Q-switched pulses of the conventional single-cavity configuration. In the single-cavity configuration, once the Q-switch which is a saturable absorber has absorbed the main cavity output photons with a wavelength of 1064 nm and become transparent, the transparent state is maintained. In order to simplify the calculation of $N_a(t)$, the spontaneous transition process which is sufficiently slower than the fast Q-switching process, was disregarded. If considering the spontaneous transition process, only an insignificant change will occur, that is to say, $N_a(t)$-curves will return slowly to a closed state at which a light is absorbed on the original level by the spontaneous transition after $\phi_m(t)$ ceases.

From the $\phi_m(t)$-curves of FIG. 2(D), it is clearly demonstrated that the dual-cavity configuration emits laser pulses with near-symmetrical pulse profiles. That is, long decay tails of single-cavity laser output pulses are cut off due to the reclosing of the saturable absorber, as clearly shown in $N_a(t)$-curves of FIG. 2(D). The reclosing is caused by lasing of the auxiliary cavity photons with a wavelength of 1120 nm (see: the $\phi_a(t)$-curves of FIG. 2(D).

Figure 3:
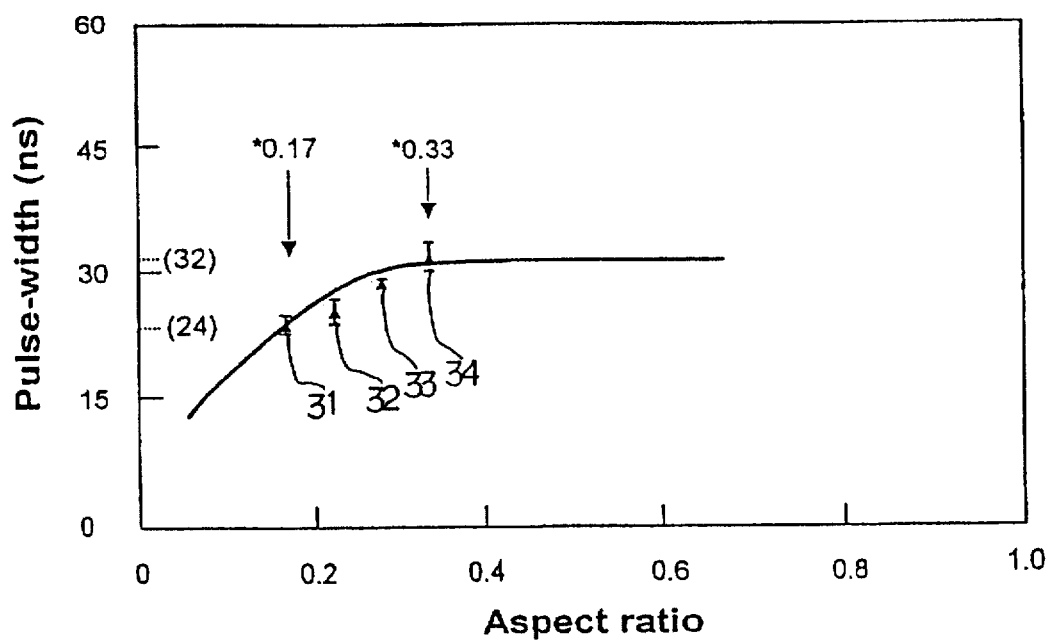

FIG. 3 shows the change of the pulse width versus the aspect ratio in the dual-cavity configuration, wherein the solid line represents the theoretical simulation results, and the arrows (31, 32, 33, 34) represent the ranges of experimental results. As can be seen in FIG. 3, it is clearly demonstrated that decrease in the aspect ratio reduces the pulse width from 47 ns of a conventional single-cavity configuration to 24~32 ns of the dual-cavity configuration. When the aspect ratio is less than 0.17($l_{ac}$<15 cm), both of Q-switched and mode-locked pulses which coincide with the mode-beating effect were observed; and, therefore, it was impossible to measure the pulse width at the aspect ratio of less than 0.17. Also, no experimental results could be obtained at the aspect ratio of 0.33 or more, due to the geometrical limitation of the optical parts forming the dual-cavity of this embodiment.

As fully described above, it was determined that the width of a laser pulse emitted from the dual-cavity configuration of the invention can be varied in a range of 32 ns to 24 ns, by controlling the aspect ratio; and the pulse width increases with the increase of the aspect ratio, which is grounded that the lasing of the 1120 nm photons is more easily occurred, and thus, the reclosing proceeds more quickly at a smaller aspect ratio than at a larger one. In the above embodiment, the aspect ratio was limited to a range of 0.17 to 0.33 due to the geometrical structure of the experimental setup used.

However, it is apparent that if other types of laser medium are used and appropriate materials are chosen as a passively Q-switching medium, to modify the geometrical structure of the dual-cavity, the tuning range of the aspect ratio can be extended further: For example, a dual-cavity configuration of the invention can be formed by employing an Nd:YAG laser or a Nd:glass laser as a laser medium and a LiF colour-center crystal or a dye as a Q-switching medium, and by employing mirror coatings for the wavelengths which correspond to the wavelengths emitted from the laser and the passively Q-switching media as an auxiliary cavity mirror and a main cavity mirror, respectively. Another dual-cavity configuration of the invention can be formed by employing other laser medium, e.g., $CO_2$ laser, instead of the Nd:YAG laser, and other saturable absorber such as $SF_6$ as a Q-switching medium, instead of the LiF colour-center crystal, and by employing mirror coatings for the wavelengths emitted from the $CO_2$ laser and the saturable absorber, respectively. Alternatively, a dual-cavity configuration of the invention may be formed by employing an Nd:YAG laser or any other laser as the main cavity laser, a LiF colour-center crystal or any other material as a Q-switching medium, and mirror coatings therefor.

As clearly illustrated and demonstrated above, according to the passively Q-switched laser with a dual-cavity configuration employing both a main and an auxiliary cavities of the present invention, laser pulses with short and symmetrical profiles can be obtained by the reclosing of the passively Q-switching medium without incidental equipments such as an expensive and precise timing control and external driving circuitry, and the width of laser pulses can be varied by controlling the aspect ratio.

What is claimed is:

1. A passively Q-switched laser with a dual-cavity configuration which comprises:

a cavity mirror with broad band full reflection;

an auxiliary cavity mirror comprised of a dichroic mirror having a first surface with a reflectivity of 10% or more and a second surface with zero reflection, and disposed such that the first surface of the dichroic mirror is aligned with said cavity mirror;

a main cavity mirror aligned with the second surface of the dichroic mirror;

a laser medium formed between the main cavity mirror and the auxiliary cavity mirror for generating a laser signal having a pulse width and a tail; and, a passively Q-switching medium disposed between the cavity mirror and the auxiliary cavity mirror, such that said medium received and switchably transmits the laser signal, such that the cavity mirror, the passively Q-switching medium and the auxiliary cavity mirror constitute an auxiliary cavity to reduce the pulse width of the laser signal and thereby shorten the tail of the laser signal, and the cavity mirror, the passively Q-switching medium, the laser medium and the main cavity mirror constitute a male cavity, wherein said auxiliary cavity is within said main cavity and each of said auxiliary cavity and main cavity share said cavity mirror.

2. The passively Q-switched laser with a dual-cavity configuration of claim 1 wherein the laser medium is Nd:YAG or Nd:glass.

3. The passively Q-switched laser with a dual-cavity configuration of claim 1 wherein the passively Q-switching medium is LiF or a dye.

4. The passively Q-switched laser with a dual-cavity configuration of claim 1 wherein the laser medium is composed of $CO_2$, and the passively Q-switching medium is composed of $SF_6$.

5. The passively Q-switched laser with a dual-cavity configuration of claim 1 wherein the auxiliary cavity mirror is movable along a direction of a cavity length within the main cavity.

6. The passively Q-switched laser with a dual-cavity configuration of claim 1 wherein the second surface of the auxiliary cavity mirror has zero reflection for a wavelength emitted by the passively Q-switching medium and the first surface has a reflectivity of 10% or more for a wavelength emitted from the laser medium.

* * * * *